Figure 1:
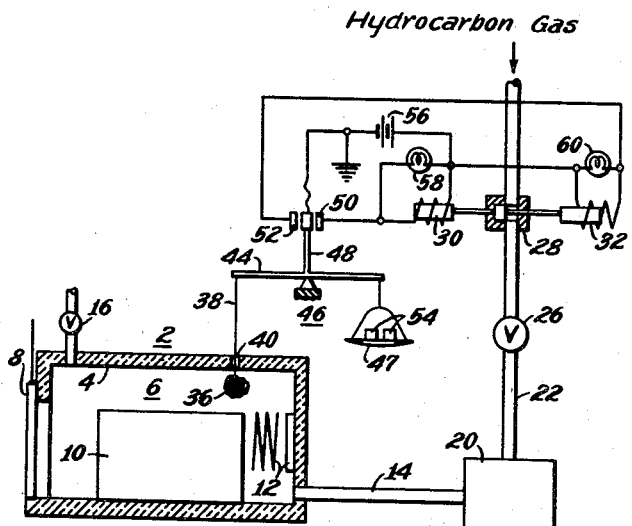

Jan. 18, 1949.　　　　　H. E. CARTIER　　　　　2,459,618
HEAT TREATING MEANS UTILIZING CONTROLLED
CARBONACEOUS GASEOUS ATMOSPHERES
Filed July 5, 1947

WITNESSES:
Robert C. Baird
Rw. C. Groome

INVENTOR
Harold E. Cartier.
BY
B. L. Zangwill
ATTORNEY

Patented Jan. 18, 1949

2,459,618

UNITED STATES PATENT OFFICE 2,459,618

HEAT-TREATING MEANS UTILIZING CONTROLLED CARBONACEOUS GASEOUS ATMOSPHERES

Harold E. Cartier, White Bear, Minn., assignor to Westinghouse Electric Corporation, East Pittsburgh, Pa., a corporation of Pennsylvania Application July 5, 1947, Serial No. 759,274

2 Claims. (Cl. 266—2)

This invention relates to the art of heat-treating ferrous materials or objects in a heat-treating furnace and while the material or object is enveloped by a gas of a carbonaceous type.

It is common to heat-treat steel and similar metals in a gas that will maintain or affect the surface or other parts of the steel or metal in some desired way. The term "controlled gaseous atmosphere," or "gaseous atmosphere," is hereinafter used to signify such a gas. Such gaseous atmospheres have a "carbon pressure" or a "carbon potential" that indicates when the gaseous atmosphere would be in carbon equilibrium with a hot steel under certain circumstances. In other words, the carbon potential is a measure of a characteristic of the gas, for estimating whether or not the gas would carburize or decarburize a steel of certain carbon content, or remain neutral with respect thereto, under certain conditions.

Generally, however, the exchange of carbon between a piece of steel in a heat-treating furnace and a controlled gaseous atmosphere enveloping the steel is affected by such variables as temperature, analysis of the steel, the ratio of oxidizing to reducing constituents or components making up the controlled gaseous atmosphere, occluded gases in the furnace brickwork and other factors. A general object of my invention is to provide a heat-treating system for heat-treating steel in a furnace and the like while the steel is enveloped by a controlled gaseous atmosphere, the system including means which automatically maintains the gaseous atmosphere at a suitable carbon potential for the heat-treatment desired, irrespective of the usual changes in the aforesaid variables during such a treatment.

An object of my invention is to provide a system in which a steel can be heat-treated while enveloped by an inexpensive gaseous atmosphere which has a carbon potential that is kept related to the way in which it is desired to affect the exposed parts of the steel.

It is a further object of this invention to control, for a period of time, the average carburizing power of a controlled gaseous atmosphere within a furnace.

It is a further object of my invention to provide a heat-treating system in which a steel charge, or work, can be heat-treated so as to be carburized or decarburized in a predetermined way.

In accordance with a preferred embodiment of my invention, a small sample of the steel work being heat-treated is placed alongside the work, so that the work-sample and the work are heat-treated in the same way and while enveloped by the same controlled gaseous atmosphere. Hence, the work-sample and the work will give carbon up to the gaseous atmosphere when the last is relatively decarburizing, and will take carbon from the gaseous atmosphere when it is relatively carburizing. During decarburization the work-sample changes, as for example, by losing weight; and during carburization it changes in the opposite sense. In the preferred embodiment, a means responsive to this change of weight is used as a detector for regulating translating equipment which controls the quality of the gaseous atmosphere to the end that the enveloping gaseous atmosphere is made more or less decarburizing or carburizing, as the situation inside the heat-treating furnace may demand.

Figure 2:
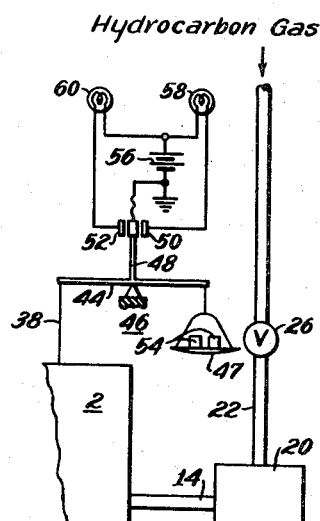
Figure 3:
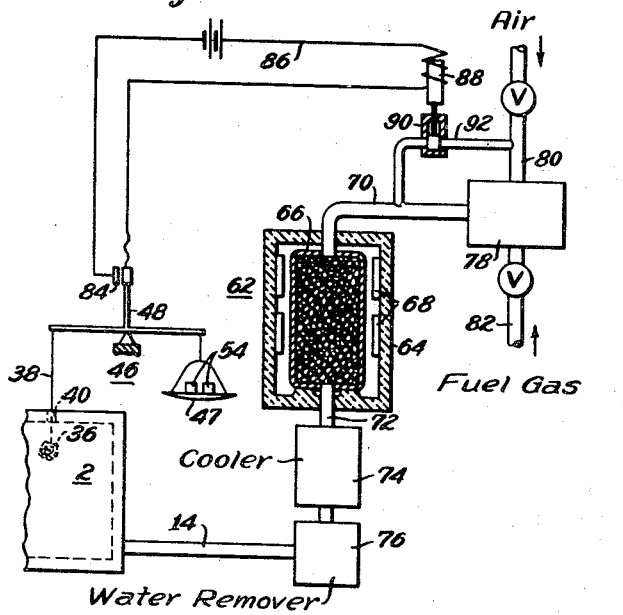
Figure 4:
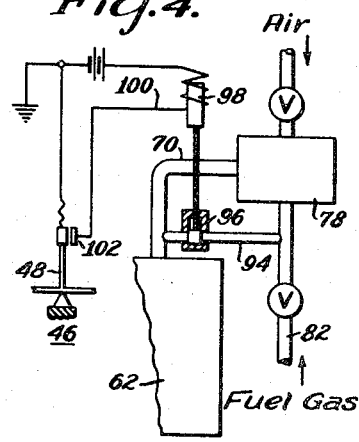

Objects, features and innovations of my invention, in addition to the foregoing, will be apparent from the following description of several embodiments thereof, to which, however, my invention is not limited. The description is to be taken in conjunction with the accompanying schematic and symbolic drawing. In the drawing, in which like numerals represent corresponding parts:

Figure 1 is a representation of a form of my invention for automatically regulating the carbon potential of a controlled gaseous atmosphere supplied to a heat-treating furnace;

Fig. 2 is a partial representation of a form of my invention embodying a signalling scheme for indicating changes in the weight of the work-sample enveloped by a gaseous atmosphere inside a heat-treating furnace; and Figs. 3 and 4 are representations of modified forms of my invention, in which the controlled gaseous atmosphere is produced by means of a gas generator, the carbon potential of the gaseous atmosphere being controlled by regulating the initial supply gasses fed to the gas generator.

An electric heat-treating furnace, indicated in its entirety by the reference numeral 2, is schematically shown in Fig. 1. The furnace 2 comprises walls 4 defining a heating chamber 6 and has an access door 8 for an opening through which work 10 is introduced into and removed from the heating chamber 6. The furnace comprises electrical heating elements 12 on the furnace walls. The heating elements are suitably energized and controlled in any conventional way for maintaining the heating chamber 6 at some desired temperature or temperatures.

The controlled gaseous atmosphere for enveloping the work 10 during heat-treatment is fed into the furnace at any desired rate, through an inlet pipe 14. In order to maintain the atmosphere in the furnace fresh and uniform in composition, some of it is permitted to leak out of the furnace through openings in the furnace walls, such as crevices around the door 8, and through an adjustable vent 16.

In the embodiment shown in Fig. 1, the controlled gaseous atmosphere fed to the furnace consists of a prepared gas to which small controlled amounts of a hydrocarbon gas, such as methane, may be added. Preferably, but not necessarily, the hydrocarbon gas is added to the prepared gas before the mixture flows into the heating chamber 6. The principal prepared gas is essentially satisfactory for enveloping the work except that it is deliberately made somewhat decarburizing with respect thereto under the conditions encountered in the furnace 2. The addition of the hydrocarbon gas results in a gas which is enriched in carbon, that is, its carbon potential is increased. The prepared gas can be obtained in any suitable way, as indicated for example in the Bowling Patent No. 1,979,820, dated November 6, 1934, and the Marshall Patent No. 2,085,597, dated June 29, 1937. The prepared gas flows through a supply pipe 18 into a gas mixing chamber 20. The hydrocarbon gas is fed into the mixing chamber 20 through a separate supply pipe 22. The supply pipes 18 and 22 are provided with adjustable manually operated valves 24 and 26, respectively; and the supply pipe 22 is also provided with a two-position electromagnetically operated valve 28. The electromagnetic valve 28 can be moved to open position by energization of a solenoid 30 and to closed position by energization of a solenoid 32.

When the valve 28 is open, a small amount of hydrocarbon gas flows into the mixing chamber 20, and mixes with the prepared gas from the supply pipe 18, to provide an enriched gaseous atmosphere in the inlet pipe 14. When the valve 28 is closed, only the prepared gas flows into the mixing chamber. Under the first operating-condition the enveloping gaseous atmosphere flowing into the heating chamber 6 is relatively richer in carbon, as compared to the enveloping gaseous atmosphere flowing into the heating chamber under the second operating condition in which the valve 28 is closed.

In accordance with my invention, the carbon quality of the enveloping gaseous atmosphere fed into the heating chamber 6 is controlled by a means which comprises a work-sample 36, which is made of a material that is the same as the work 10. Both are exposed in the heating chamber 6. Hence, both will be enveloped by the particular gaseous atmosphere supplied through the pipe 14. Preferably, the work-sample is made of turnings or shavings of the work-material, so as to expose a large area to the action of the enveloping gaseous atmosphere. I have found that about 50 square centimeters area results in satisfactorily rapid regulation for general purposes. However, the greater the area, the closer will be the regulation.

The work-sample is supported by a wire 38 that passes through a slightly larger hole 40 in the top wall of the furnace. Suitable means may be provided for limiting leakage through the hole. The wire 38 is fastened to one arm of a first-class lever 44 of a balance 46, the other arm of which carries a weight-receiving pan 47. The lever 44 carries a switch arm 48 that is preferably electrically grounded. When the balance 46 is balanced, the switch arm 48 is in a position between two slightly spaced stationary electrically insulated contacts 50 and 52. The balance is balanced by means of tareweights 54, at some predetermined weight of the work-sample 36.

The contact 50 is in a circuit which includes the solenoid 30 and a source of power shown as a battery 56. The contact 52 is in a circuit which includes the solenoid 32 and the battery 56. Assuming that the balance 46 is balanced when the work-sample has the desired amount of carbon, the switch arm 48 is between the contacts 50 and 52 so that no electric circuit is completed. If, now, the controlled gaseous atmosphere should, for some reason, be decarburizing with respect to the work-sample 36, and hence with respect to the work 10, the work-sample will lose weight. This loss of weight unbalances the balance 46, and causes the switch arm 48 to swing into engagement with the stationary contact 50 where the switch arm completes an energizing circuit to the solenoid 30. Energization of the solenoid 30 moves the valve 28 to open position for enriching the enveloping gaseous atmosphere flowing into the heating chamber 6. The adjustment of the hand valve 26 is preferably such that the resulting enveloping gaseous atmosphere in the heating chamber 6 is carburizing with respect to the work 10 and the work-sample 36.

When the work-sample has absorbed carbon to a point for re-balancing the balance 46, the switch arm 48 disengages the contact 50, and interrupts the energization of the enriching solenoid 30. The work-sample continues to absorb carbon and the balance becomes unbalanced in the direction toward the contact 52. The switch arm 48 moves into engagement with the contact 52, and completes a circuit to the leaning solenoid 32. Upon energization, the solenoid 32 moves the valve 28 to closed position. The closed valve 28 stops the flow of hydrocarbon gas in the supply pipe 22, so that only the prepared gas from the pipe 18 flows into the heating chamber 6. The prepared gas is decarburizing with respect to the work 10 and work-sample 36 in the heating chamber 6. This means that the work-sample will now lose weight. When it has lost enough weight, the lever 44 swings the switch arm 48, firstly, away from the contact 52 so as to interrupt the circuit to the solenoid 32, which interruption does not affect the valve 28, and then into engagement with the contact 50, whereupon the solenoid 30 is energized and the valve 28 moved from its closed to its open position. The cycle described then repeats so that there are succeeding periods of carburization and decarburization. The enveloping gaseous atmosphere in the furnace is alternately on the rich side and on the lean side with respect to an intermediate carbon potential. This intermediate carbon potential can be, if desired, a neutral condition in carbon equilibrium with the desired condition of the work and work sample.

Should the carbon potential of either of the gases flowing through the pipes 18 and 22 change, or should their rates of flow change, or should some other disturbing factor be involved, the resulting enveloping gaseous atmosphere in the furnace will become either more caruburizing or more decarburizing with respect to the work and work-sample as compared to the original adjustments. If it becomes more carburzing, the work-sample will gain weight faster and close the valve 28 sooner so that the enriching hydrocarbon gas will be supplied for a relatively shorter period. Should it become more decarburizing, the enriching gas will be supplied for a relatively longer period.

It is also evident that the apparatus herein described lends itself to controlling the rate of carburization or decarburization of a piece of steel. By adding or subtracting increments of weight to the pan 47 of the balance 46 the average or equilibrium point between the gas and work is correspondingly changed.

As the weight in the pan 47 is increased the carburization of the work and work-sample will increase at an average rate determined by the time between each increase in the weights 54. For decarburization, increments of weight can be removed from the pan 47 at intervals. In the periods between changes in the weights 54, the work-sample will temporarily over carburize or under decarburize, as the case may be, with respect to same average, in accordance with the position of the balance arm 48 and the particular actual weight in the pan 47. The average carbon potential will be determined by each total weight in the pan 47, until a further increment of weight is added to or subtracted from the pan. The apparatus then adjusts the average carbon potential of the enveloping gaseous atmosphere to the new total weight in the pan. The time between changes in weight, obviously, is dependent on the character of each particular use of the equipment; the only caution to be observed being that the intervals between weight changes must not be so short as to prevent the work from reaching an average equilibrium with the gas.

If desired, signalling lamps 58 and 60 can be provided in parallel with the solenoids 30 and 32, respectively, for indicating the operating-condition of the equipment, since the balance 46 will usually be unbalanced and the switch arm in engagement with one or the other of the contacts 50 and 52.

My invention lends itself to manual operation through the use of the signal lamps. Such an embodiment is shown in Fig. 2, in which the valve 28 and its operating solenoids 30 and 32 are not used. When the lamp 58 lights, the hand valve 26 may be opened, and when the lamp 60 lights, the hand valve may be closed.

Instead of adding a hydrocarbon gas of high carbon potential directly to an already-prepared gas which is, of itself, of utilizable carbon potential with respect to the work, my invention can be applied to gas-generators which produce prepared gas. Such a modification is shown in simplified form in Fig. 3 in which the inlet pipe 14 is supplied with an enveloping gaseous atmosphere that comprises the gas generated or produced in a gas generator of any suitable or conventional form.

A gas generator 62 is shown comprising insulating walls 64 defining a space within which is disposed a catalyst-filled reaction vessel 66 that can be heated by means of electric heating elements 68. The reaction vessel 66 is closed except for an inlet pipe 70 and an outlet pipe 72. The outlet pipe 72 is connected to a cooler 74 which, in turn, is connected to a water remover 76, the outlet of which fits the inlet pipe 14 that is connected to a heat-treating furnace 2 corresponding to that shown in Fig. 1.

The inlet pipe 70 is connected to a proportioning gas mixing device 78 which takes air from a pipe 80 and a fuel gas from a pipe 82, and mixes the air and fuel gas in a desired proportion for reaction in the catalyst-filled reaction vessel 66. In this vessel the mixture is converted into a product gas suitable for a controlled gaseous atmosphere as is known to the art.

In Fig. 3, the proportion of air and fuel gas supplied to the reaction vessel 66 is so adjusted that the final product gas is preferably slightly carburizing with respect to the work and work-sample in the furnace heating chamber 6. After a time, the work-sample 36 will be carburized and will swing the switch arm 48 of the balance 46, into engagement with a stationary insulated contact 84, thereby completing a circuit 86 which includes a solenoid 88 for operating a valve 90. The valve 90 is normally biased closed and remains open so long as the solenoid 88 is energized. The valve 90 is in a by-pass pipe 92 connected to the air supply pipe 80. When the valve 90 is opened by energization of the solenoid 88, additional air is added to the gas mixture flowing in the pipe 70 and into the reaction vessel 66. The resulting product gas is made leaner to the point where it will absorb carbon from the work-sample 36. When the work-sample becomes lighter, the switch arm 48 disengages from the contact 84, deenergizing the solenoid 88 so that the valve 88 closes through its own bias. Accordingly, the original gas mixture flows into the gas generator 62.

Instead of making the principal gas mixture in the pipe 70 somewhat carburizing, as in Fig. 3, so that air must be periodically added, the system can be modified so that the reaction of the mixture of the air and fuel gas coming from the pipes 80 and 82 only, results in an enveloping gaseous atmosphere in the heating chamber 6, which is slightly decarburizing. Under such circumstances, the arrangement must be such that the work-sample 36 periodically causes the enveloping gas to be more carburizing. Fig. 4 indicates such a system and differs from Fig. 3 in that an enriching gas is added to the principal gas mixture flowing to the gas generator 62. To this end, a bypass pipe 94 is provided from the fuel gas supply pipe 82, and includes a normally-biased-closed valve 96 operable to open position upon energization of a solenoid 98 in a circuit 100. The circuit 100 is completed when switch arm 48 of the balance 46 engages a contact 102. This happens when the work-sample has decreased in weight to a proper extent.

While I have described my invention in forms now which I prefer, it is obvious that my invention is subject to many different modifications and wide variations.

I claim as my invention:

1. Apparatus of a type described comprising, in combination, a furnace having walls defining a treating chamber in which work can be heat-treated while the chamber is permeated by a gaseous atmosphere, an inlet pipe connected to said furnace, a mixing chamber connected to said inlet pipe for feeding a gaseous atmosphere to said inlet pipe, a plurality of gas-pipes to said mixing chamber through which different gases are adapted to be supplied to said mixing chamber, which gases make up the last said gaseous atmosphere, supporting means for supporting a work-sample in said treating chamber, said supporting means comprising a member passing through an opening in a wall of said furnace, weighing mechanism outside the treating chamber and associated with said member of said supporting means for weighing the work-sample, and means comprising a valve operated by changes in said weighing mechanism for changing the flow of gas through one of said gas-pipes, for changing the composition of the last said gaseous atmosphere.

2. Apparatus of a type described comprising, in combination, a furnace having walls defining a treating chamber in which work can be heat-treated while the treating chamber is permeated by a gaseous atmosphere capable of affecting the work, a pipe system connected to said treating chamber for providing a controlled gaseous atmosphere of changeable composition in said treating chamber, said pipe system comprising a gas-generator having a catalyst-containing reaction chamber, an outlet pipe system from the gas-generator to said treating chamber, and a plurality of pipes connected to said reaction chamber for supplying component gases to said reaction chamber for making said gaseous atmosphere, a valve in one of said pipes, electromagnetic means for operating said valve, supporting means for supporting a work-sample in said treating chamber in a manner to be enveloped by said gaseous atmosphere, weighing means for weighing said work-sample, said supporting means comprising a member passing through an opening in a furnace-wall, a switch means associated with said member of said supporting means, mechanism associated with said weighing means for operating said switch means, and an electric circuit including said electromagnetic means and said switch means.

HAROLD E. CARTIER.

REFERENCES CITED

The following references are of record in the file of this patent:

UNITED STATES PATENTS

| Number | Name | Date |
|---|---|---|
| 1,593,890 | Welch | July 27, 1926 |
| 1,615,481 | Poole | Jan. 25, 1927 |
| 1,711,100 | Payzant | Apr. 30, 1929 |
| 1,734,536 | Sorrel et al. | Nov. 5, 1929 |
| 1,753,176 | Stevens | Apr. 1, 1930 |
| 2,040,729 | DeCissey | May 12, 1936 |
| 2,142,139 | Machlet | Jan. 3, 1939 |
| 2,161,162 | Harsch | June 6, 1939 |
| 2,191,133 | Pearson | Feb. 20, 1940 |
| 2,275,106 | Hayes | Mar. 3, 1942 |